United States Patent
Mori

(10) Patent No.: US 9,232,100 B2
(45) Date of Patent: Jan. 5, 2016

(54) INFORMATION PROCESSING SYSTEM, CONTROL METHOD THEREOF, AND NON-TRANSITORY COMPUTER-READABLE MEDIUM WITH GENERATING AUTHORIZATION INFORMATION TO USE A FUNCTION OF THE FIRST SERVICE AND LINK INFORMATION TO CALL AN INPUT WINDOW

(71) Applicant: CANON KABUSHIKI KAISHA, Tokyo (JP)

(72) Inventor: Ryuta Mori, Nagareyama (JP)

(73) Assignee: Canon Kabushiki Kaisha, Tokyo (JP)

( * ) Notice: Subject to any disclaimer, the term of this patent is extended or adjusted under 35 U.S.C. 154(b) by 64 days.

(21) Appl. No.: 14/086,672

(22) Filed: Nov. 21, 2013

(65) Prior Publication Data
US 2014/0160512 A1 Jun. 12, 2014

(30) Foreign Application Priority Data
Dec. 11, 2012 (JP) .................. 2012-270702

(51) Int. Cl.
*H04N 1/44* (2006.01)
*H04N 1/00* (2006.01)
*H04N 1/32* (2006.01)
(52) U.S. Cl.
CPC .......... *H04N 1/00838* (2013.01); *H04N 1/324* (2013.01); *H04N 1/4426* (2013.01)

(58) Field of Classification Search
None
See application file for complete search history.

(56) References Cited

U.S. PATENT DOCUMENTS

| 6,138,237 | A | * | 10/2000 | Ruben et al. ................. 726/21 |
| 2004/0030567 | A1 | * | 2/2004 | Takeshita et al. .................. 705/1 |
| 2005/0231754 | A1 | * | 10/2005 | Uchida ........................ 358/1.15 |
| 2006/0094354 | A1 | * | 5/2006 | Munje et al. .................... 455/39 |
| 2011/0093930 | A1 | | 4/2011 | Bartel-Kurz et al. ............. 726/4 |

FOREIGN PATENT DOCUMENTS

JP 2011-519087 A 6/2011

* cited by examiner

*Primary Examiner* — Thomas D Lee
(74) *Attorney, Agent, or Firm* — Fitzpatrick, Cella, Harper & Scinto

(57) ABSTRACT

A first service in a system in which a plurality of services cooperatively perform processing, comprises: a generation unit which generates authorization information to use a function provided by the first service and link information to call an input window of the authorization information; a holding unit which holds the link information and the authorization information in association with each other; a providing unit which provides the link information to a second service; a notification unit which notifies a user of the authorization information; a displaying unit which displays the input window corresponding to the link information when the user has designated the link information obtained from the second service; and a permission unit which permits use of the function provided by the first service when the user has input the notified authorization information to the displayed input window.

12 Claims, 12 Drawing Sheets

FIG. 5

| TENANT ID | USER ID | AUTHORIZATION CODE | INDIVIDUAL URL INFORMATION |
|---|---|---|---|
| AAA1022 | 121315 | b0lks5230lo | http://scan.a1.aas.com/scan/auth?hl=en&fad43y2fdad5&lr=lang-en |
| AAA1023 | 343243 | lxxizq5rhfz | http://scan.a1.aas.com/scan/auth?hl=en&o48hd95fgak&lr=lang-en |

500 501 502 503

F I G. 12

| 1200 | 1201 | 1202 | 1203 | 1204 |
|---|---|---|---|---|
| TENANT ID | USER ID | AUTHORIZATION CODE 1 | AUTHORIZATION CODE 2 | INDIVIDUAL URL INFORMATION |
| AAA1022 | 121315 | b0lks5230lo | fasdfag3t4k | http://scan.a1.aas.com/scan/auth?hl=en&fad43y2fdad5&lr=lang-en |
| AAA1023 | 343243 | lxxizq5rhfz | k94ughs4t7d | http://scan.a1.aas.com/scan/auth?hl=en&o48hd95fgak&lr=lang-en |

# INFORMATION PROCESSING SYSTEM, CONTROL METHOD THEREOF, AND NON-TRANSITORY COMPUTER-READABLE MEDIUM WITH GENERATING AUTHORIZATION INFORMATION TO USE A FUNCTION OF THE FIRST SERVICE AND LINK INFORMATION TO CALL AN INPUT WINDOW

BACKGROUND OF THE INVENTION

1. Field of the Invention

The present invention relates to an information processing system, a control method thereof, and a non-transitory computer-readable medium and, more particularly, to authorization processing between services.

2. Description of the Related Art

The OAuth protocol is a representative standard technology of implementing a service call between cloud services that have currently become widespread. The OAuth protocol is a protocol to delegate authorization information (authority). For example, assume that a service A and a service B exist, and the user is using the function of the service A. To allow the service A to access user information held by the service B, the user authorizes the service A to use the function of the service B. The service A can use the function of the service B within the range of the thus delegated authority.

To use the OAuth protocol between services, implementation (installation of functions) to cope with the OAuth protocol is needed on the service providing side and the service using side. The service using side needs implementation corresponding to the degree of implementation of OAuth protocol specifications on the service providing side and additional unique security implementation. For this purpose, each service using side is required to implement the OAuth protocol complying with the service providing side.

Japanese Patent Laid-Open No. 2011-519087 discloses a system that performs access control using authorization information to cause a client to use functions provided by the service providing side. The client side where the service is used creates an authorization message to cause the service providing side to check authorization information. The service providing side receives the authorization message created by the client, and then checks the expiration date to determine whether the service is usable.

In Japanese Patent Laid-Open No. 2011-519087, to allow the client side to use the functions provided by the service providing side, the client side needs implementation to generate authorization information complying with the service providing side.

On the other hand, corporations that use inter-service cooperation by the OAuth protocol are increasing year by year. Under these circumstances, it is difficult to implement the protocol in correspondence with individual services because of the number of services, cost, and the like.

SUMMARY OF THE INVENTION

According to one aspect of the present invention, there is provided an information processing system in which a plurality of services cooperatively perform processing, wherein a first service comprises: a generation unit configured to generate authorization information to use a function provided by the first service and link information to call an input window of the authorization information; a holding unit configured to hold the link information and the authorization information in association with each other; a providing unit configured to provide the link information to a second service; a notification unit configured to notify a user of the authorization information; a displaying unit configured to display the input window corresponding to the link information on an apparatus used by the user when the user has designated the link information obtained from the second service; and a permission unit configured to permit use of the function provided by the first service when the user has input the notified authorization information to the input window displayed by the displaying unit.

According to another aspect of the present invention, there is provided an information processing system in which a plurality of services cooperatively process a job, wherein a first service comprises: a processing unit configured to process the job in accordance with an instruction of a user; a generation unit configured to generate authorization information to use a processing result of the job by the processing unit and link information to call an input window of the authorization information; a holding unit configured to hold the link information and the authorization information in association with each other; a providing unit configured to provide the link information to a second service; a notification unit configured to notify the user of the authorization information; a displaying unit configured to display the input window corresponding to the link information on an apparatus used by the user when the user has designated the link information obtained from the second service; and a permission unit configured to permit use of the processing result of the job by the processing unit in the second service when the user has input the notified authorization information to the input window displayed by the displaying unit.

According to another aspect of the present invention, there is provided a control method of an information processing system in which a plurality of services cooperatively perform processing, comprising: in a first service, generating authorization information to use a function provided by the first service and link information to call an input window of the authorization information; holding the link information and the authorization information in a storage unit in association with each other; providing the link information to a second service; notifying a user of the authorization information; displaying the input window corresponding to the link information on an apparatus used by the user when the user has designated the link information obtained from the second service; and permitting use of the function provided by the first service when the user has input the notified authorization information to the input window displayed in the displaying step.

According to another aspect of the present invention, there is provided a control method of an information processing system in which a plurality of services cooperatively process a job, comprising: in a first service, processing the job in accordance with an instruction of a user; generating authorization information to use a processing result of the job in the processing step and link information to call an input window of the authorization information; holding the link information and the authorization information in a storage unit in association with each other; providing the link information to a second service; notifying the user of the authorization information; displaying the input window corresponding to the link information on an apparatus used by the user when the user has designated the link information obtained from the second service; and permitting use of the processing result of the job in the processing step in the second service when the user has input the notified authorization information to the input window displayed in the displaying step.

According to another aspect of the present invention, there is provided a non-transitory computer-readable medium storing a program that causes a computer to function as: a generation unit configured to generate authorization information to use a function provided by the computer and link information to call an input window of the authorization information; a holding unit configured to hold the link information and the authorization information in association with each other; a providing unit configured to provide the link information to another computer; a notification unit configured to notify a user of the authorization information; a displaying unit configured to display the input window corresponding to the link information on an apparatus used by the user when the user has designated the link information obtained from the other computer; and a permission unit configured to permit use of the function provided by the computer when the user has input the notified authorization information to the input window displayed by the displaying unit.

According to another aspect of the present invention, there is provided a non-transitory computer-readable medium storing a program that causes a computer to function as: a processing unit configured to process a job in accordance with an instruction of a user; a generation unit configured to generate authorization information to use a processing result of the job by the processing unit and link information to call an input window of the authorization information; a holding unit configured to hold the link information and the authorization information in association with each other; a providing unit configured to provide the link information to another computer; a notification unit configured to notify the user of the authorization information; a displaying unit configured to display the input window corresponding to the link information on an apparatus used by the user when the user has designated the link information obtained from the other computer; and a permission unit configured to permit use of the processing result of the job by the processing unit in the other computer when the user has input the notified authorization information to the input window displayed by the displaying unit.

It is possible to perform processing on the service providing side without using an inter-service cooperation protocol such as the OAuth protocol and suppress the protocol implementation load on the service using side.

Further features of the present invention will become apparent from the following description of exemplary embodiments (with reference to the attached drawings).

BRIEF DESCRIPTION OF THE DRAWINGS

FIG. 5 is a view showing an example of a data management table according to the first and third embodiments;

FIG. 12 is a view showing an example of a data management table according to the second embodiment;

DESCRIPTION OF THE EMBODIMENTS

Hereinafter, embodiments of the present invention will be described in detail with reference to the accompanying drawings. It should be noted that the following embodiments are not intended to limit the scope of the appended claims, and that not all the combinations of features described in the embodiments are necessarily essential to the solving unit of the present invention.

First Embodiment

The first embodiment for carrying out the present invention will now be described with reference to the accompanying drawings.

[System Arrangement]

Figure 1:
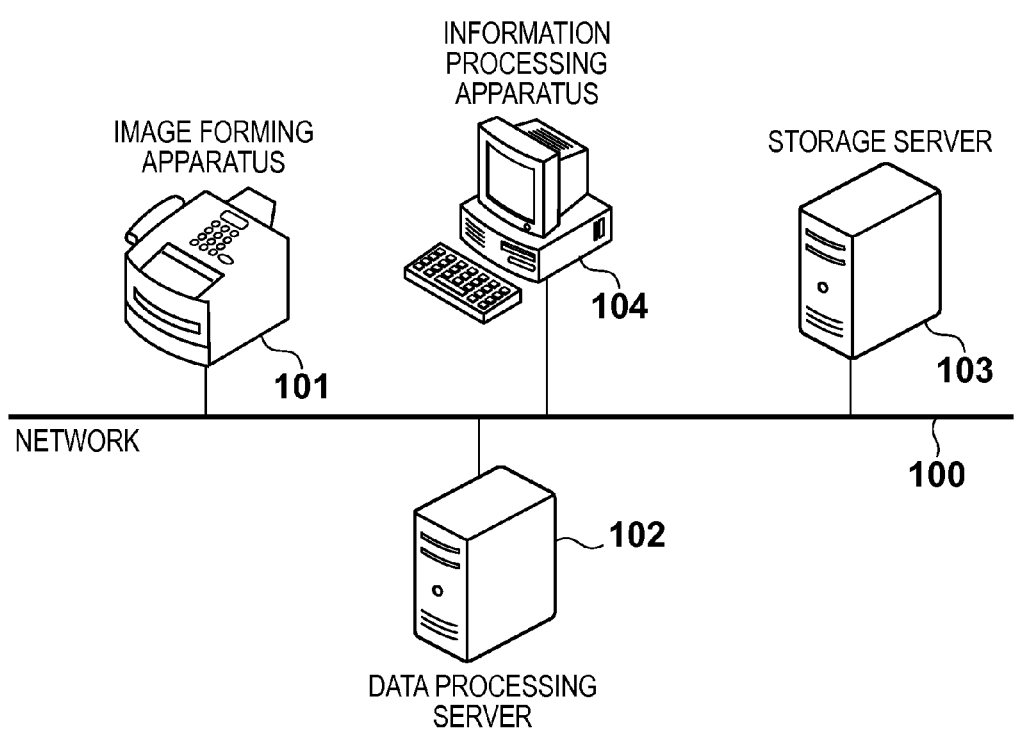
FIG. 1 is a view showing an example of the overall arrangement of an information processing system.

FIG. 1 is a view showing an example of the arrangement of a network system according to this embodiment. In this system, an image forming apparatus 101, a data processing server 102, a storage server 103, and an information processing apparatus (client) 104 are connected via a network 100. The network 100 is the platform of communication between the apparatuses, and can be an intranet, Internet, or another network system.

In this embodiment, each apparatus has a single-device arrangement. However, each apparatus may be implemented as an arrangement physically including a plurality of apparatuses. Each service may be provided by a server group.

The image forming apparatus 101 can be either a printer having only a print function or an MFP (MultiFunction Peripheral) having a plurality of functions. The data processing server 102 has functions of providing a data processing service (first service), processing a job in response to a request from the image forming apparatus 101, and registering data in the storage server 103. The storage server 103 provides a storage service (second service), and registers and holds preview images and individual URL information in response to a request from the data processing server 102. Details of various kinds of information managed here will be described later. The storage server 103 receives a request from the information processing apparatus 104, and provides a function of login processing or access control to held data.

[Hardware Arrangement]

Figure 2:
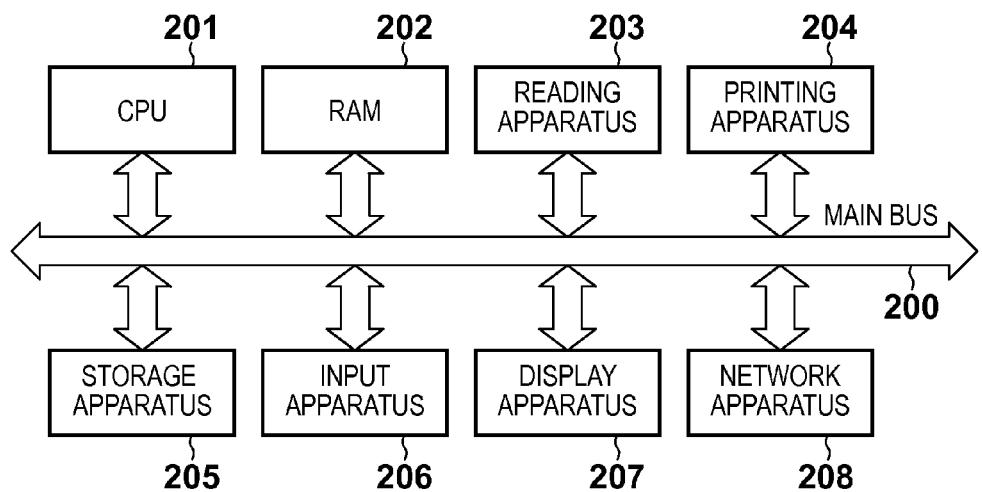
FIG. 2 is a block diagram showing an example of the arrangement of an image forming apparatus.

FIG. 2 shows an example of the arrangement of the image forming apparatus 101 according to this embodiment. The image forming apparatus 101 includes a CPU 201 that controls the entire apparatus, a RAM 202 that provides the work area of the CPU 201, a reading apparatus 203 that reads an image, and a printing apparatus 204 that prints an image. The image forming apparatus 101 also includes a storage apparatus 205, an input apparatus 206 used by the user to input commands, a display apparatus 207 that displays a window, a network apparatus 208 that communicates with another apparatus via the network, and a main bus 200. The storage apparatus 205 stores programs and various settings, and can be formed from an HDD, an NVRAM, or the like. Note that in this embodiment, the CPU 201 in the image forming apparatus 101 controls the RAM 202, the reading apparatus 203, the printing apparatus 204, the storage apparatus 205, the input apparatus 206, the display apparatus 207, and the network apparatus 208 via the main bus 200, unless specifically stated otherwise. The display apparatus 207 may be a touch panel display that also serves as the input apparatus 206.

Figure 3:
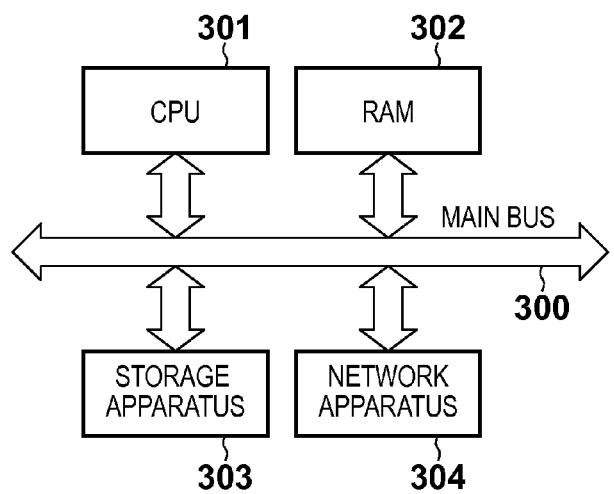
FIG. 3 is a block diagram showing an example of the arrangement of an information processing apparatus.

FIG. 3 shows an example of the hardware arrangement of each of the data processing server 102, the storage server 103, and the information processing apparatus 104 according to this embodiment. The apparatus includes a CPU 301 that controls the entire apparatus, a RAM 302 that provides the work area of the CPU 301, a storage apparatus 303 that stores programs and settings, a network apparatus 304 that communicates with another apparatus via the network, and a main bus 300. Note that in this embodiment, the CPU 301 controls the RAM 302, the storage apparatus 303, and the network apparatus 304 via the main bus 300, unless specifically stated otherwise.

[Software Configuration]

Figure 4:
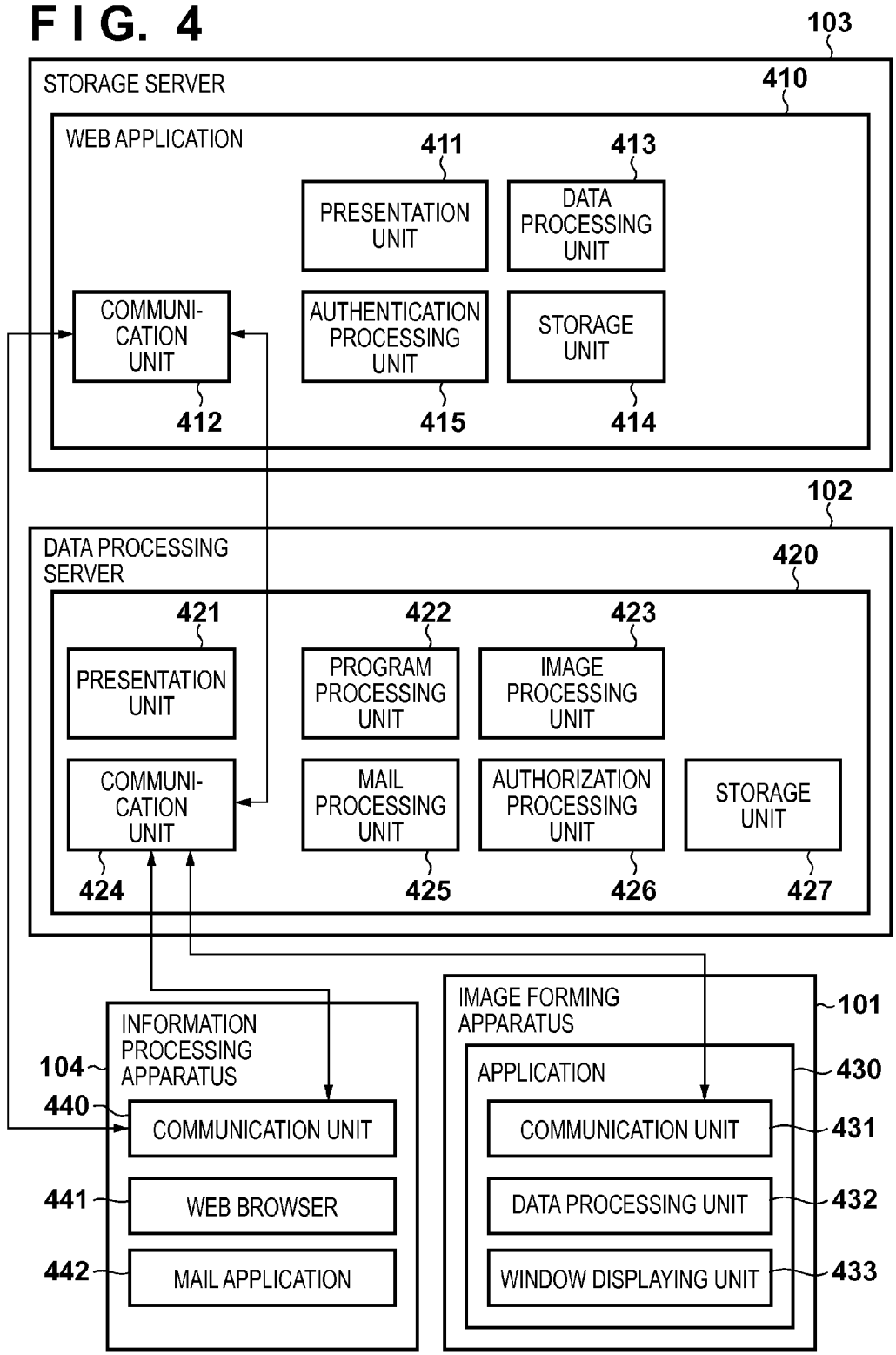
FIG. 4 is a block diagram showing an example of the configuration of software of the apparatuses included in the information processing system.

FIG. 4 is a block diagram for explaining an example of the software configuration of the entire information processing system according to this embodiment. The functional units shown in FIG. 4 are implemented by causing the CPUs 201 and 301 included in the image forming apparatus 101, the data processing server 102, the storage server 103, and the information processing apparatus 104 to perform control programs.

The image forming apparatus 101 includes an application 430. The application 430 is implemented by causing the CPU 201 included in the image forming apparatus 101 to perform a control program. In this embodiment, the data processing server 102 and the storage server 103 can transmit/receive a request/response in accordance with SOAP (Simple Object Access Protocol). However, the present invention is not limited to this.

The application 430 includes a communication unit 431, a data processing unit 432, and a window displaying unit 433. The communication unit 431 communicates with a program processing unit 422 of a Web application 420 via a communication unit 424 of the data processing server 102 in accordance with SOAP or HTTP (HyperText Transfer Protocol).

More specifically, the image forming apparatus 101 causes the reading apparatus 203 to read an image based on a value input via a setting window displayed on the window displaying unit 433. The image forming apparatus 101 transmits the read image data to the program processing unit 422 via the communication unit 431 and the communication unit 424 of the Web application 420 of the data processing server 102.

The data processing server 102 includes the Web application 420. The Web application 420 includes a presentation unit 421, the program processing unit 422, an image processing unit 423, the communication unit 424, a mail processing unit 425, an authorization processing unit 426, and a storage unit 427.

The presentation unit 421 provides an authorization code input window based on individual URL information used in this information processing system. The individual URL information will be described later together with the processing procedure. The authorization code input window will be described later with reference to FIG. 13. An authorization code expresses authorization information by a random character string and is used to determine the presence/absence of a processing performance permission for the user in the information processing system. The presentation unit 421 generates the authorization code input window based on user's access from a Web browser 441, and causes the Web browser 441 to display the authorization code input window. The data processing server 102 also causes the program processing unit 422 and the authorization processing unit 426 to perform various kinds of processing in accordance with input information of the user.

The program processing unit 422 causes the communication unit 424 to receive image data and input information from the image forming apparatus 101, and performs various kinds of processing. More specifically, the program processing unit 422 issues processing instructions to the image processing unit 423, the authorization processing unit 426, and the mail processing unit 425.

The image processing unit 423 performs image conversion processing, preview image creation processing, and the like based on an instruction from the program processing unit 422, and returns the processing result to the program processing unit 422. The communication unit 424 is a software module that performs communication via the network apparatus 304 using SOAP or HTTP.

The mail processing unit 425 performs mail transmission/reception processing based on an instruction from the program processing unit 422. The authorization processing unit 426 generates authorization information, checks the consistency of the authorization information, and instructs the storage unit 427 to hold the authorization information based on an instruction from the program processing unit 422. The storage unit 427 stores authorization information based on an instruction from the authorization processing unit 426.

The storage server 103 includes a Web application 410. The Web application 410 includes a presentation unit 411, a communication unit 412, a data processing unit 413, a storage unit 414, and an authentication processing unit 415.

The presentation unit 411 displays a login window such as an authentication window and a list window of held data as the Web application. The communication unit 412 is a software module that performs communication via the network apparatus 304 using SOAP or HTTP.

The storage unit 414 causes the communication unit 412 to receive a preview image or individual URL information from the data processing server 102, and saves the data based on an instruction from the data processing unit 413. The authentication processing unit 415 performs authentication based on a request from the Web browser 441 of the information processing apparatus 104.

The information processing apparatus 104 includes a communication unit 440, the Web browser 441, and a mail application 442. The communication unit 440 is a software module that performs communication via the network apparatus 304 using SOAP or HTTP. The Web browser 441 is used at the time of connection to the presentation unit 421 of the data processing server 102 or connection to the presentation unit 411 of the storage server 103. The mail application 442 receives email transmitted from the mail processing unit 425 of the data processing server 102.

(Data Management Table)

FIG. 5 shows an example of the arrangement of a data management table according to this embodiment. The data management table includes a tenant ID 500, a user ID 501, an authorization code 502, and individual URL information 503. The tenant ID 500 represents a tenant ID (ID assigned to each corporation) to which the user who has instructed job performance belongs. The user ID 501 is an ID assigned to uniquely identify the user who has instructed job performance belongs. The authorization code 502 is a code issued to permit processing, which is input by the user to the authorization code input window. The individual URL information 503 is link information to the URL of the authorization code input window in which the authorization code issued for each job is input. When the link information is designated, the authorization code input window is displayed on the Web browser 441 of the information processing apparatus 104.

[Procedure of Registering Authorization Code and Individual URL Information]

Figure 6:
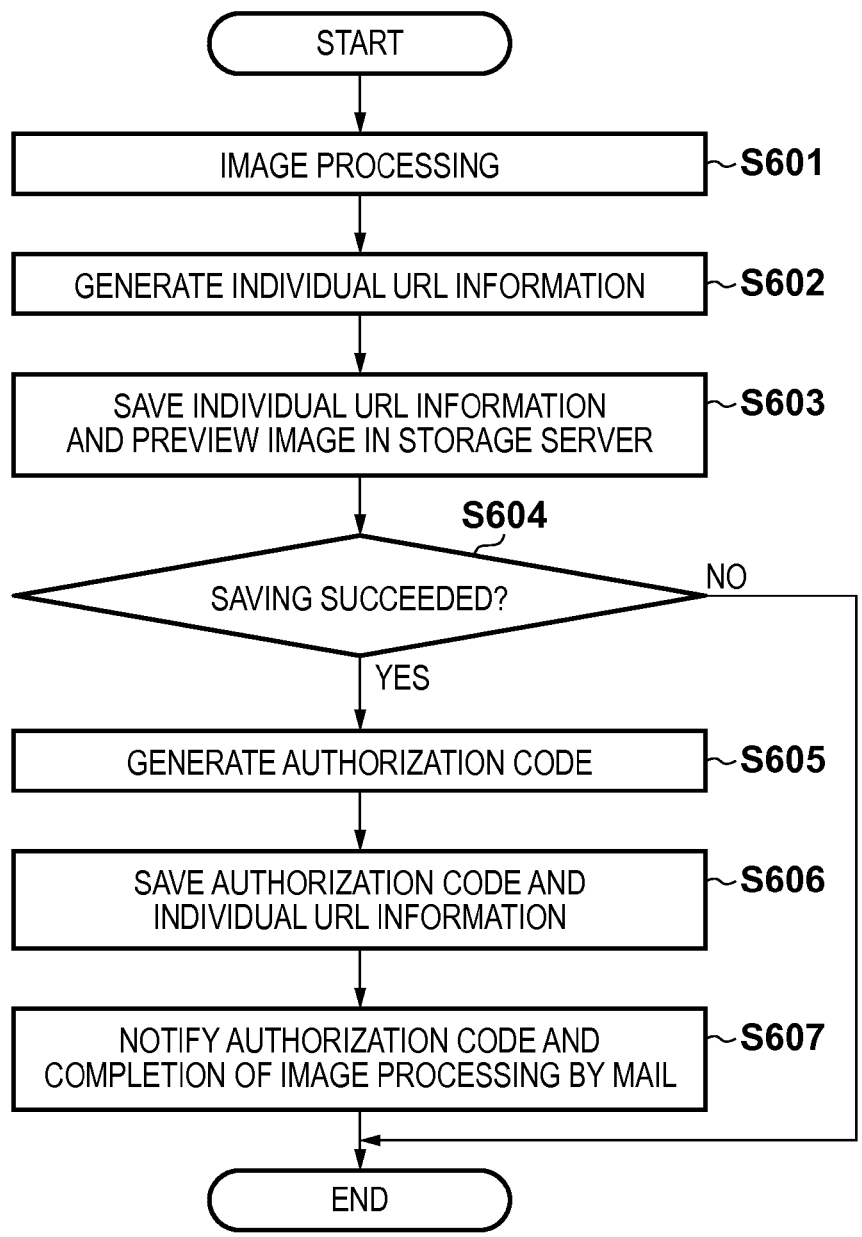
FIG. 6 is a flowchart of registration of an authorization code and individual URL information according to the first embodiment.

FIG. 6 illustrates the procedure of data registration of a preview image and the individual URL information 503 in the storage server 103 and sending of an authorization code to the user according to this embodiment. This processing procedure is implemented by causing the CPU of the data processing server 102 to read out and perform a program stored in a ROM or the like.

Note that the window displaying unit 433 of the image forming apparatus 101 is assumed to have performed scan (job) based on settings selected by the user before the start of the procedure. In addition, data to be registered in the storage server 103 and set values selected by the user are assumed to have been sent from the image forming apparatus 101 to the data processing server 102.

First, the program processing unit 422 of the data processing server 102 analyzes the set values of the user. The program processing unit 422 requests the image processing unit 423 and the authorization processing unit 426 to perform processing based on the analysis result.

In step S601, the data processing server 102 transmits data received from the image forming apparatus 101 from the program processing unit 422 to the image processing unit 423, and performs image processing. In this image processing, a processing image of a normal size and a processing image for preview are generated. In this embodiment, the processing image of the normal size is used as an image to be saved in the storage server 103 after authorization of processing. On the other hand, the processing image for preview is an image presented to the user when performing authorization processing. In step S602, the data processing server 102 generates individual URL information that is link information to the authorization code input window. As the individual URL information, a unique URL is generated for each job. In step S603, the data processing server 102 saves the generated individual URL information and the preview image data in the storage server 103. Note that in this embodiment, the individual URL information is stored in a file format (link file) at a predetermined position (folder).

In step S604, the data processing server 102 judges whether saving in the storage server 103 has failed. If saving has failed (NO in step S604), the processing ends. If saving has succeeded (YES in step S604), the data processing server 102 generates an authorization code in step S605. In step S606, the data processing server 102 associates the tenant ID, the user ID, the authorization code, and the individual URL information with each other, and registers them in the storage unit 427 using the data management table shown in FIG. 5. In step S607, the data processing server 102 transmits the authorization code 502 and an image processing completion notification from the mail processing unit 425 to the mail application 442 of the information processing apparatus 104. The processing procedure thus ends.

[Procedure of Using Authorization Code and Individual URL Information]

Figure 7:
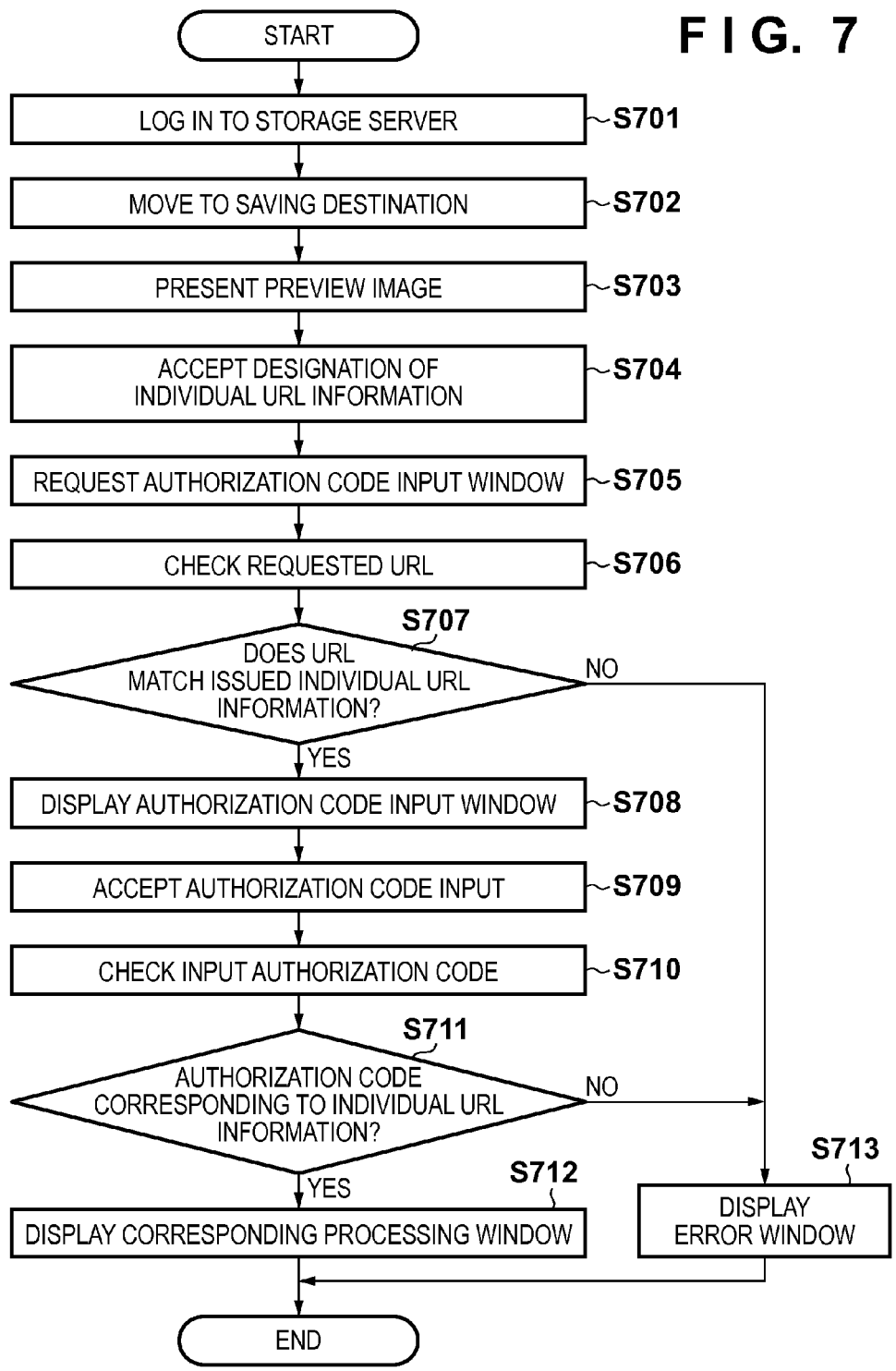
FIG. 7 is a flowchart of use of an authorization code and individual URL information according to the first embodiment.

The flowchart of FIG. 7 illustrates the processing procedure of giving a performance permission in the storage server 103 from the data processing server 102 to the user using the authorization code and the individual URL information stored in the storage server 103 according to this embodiment. This processing procedure is implemented by causing the CPU of each of the data processing server 102 and the storage server 103 to read out and perform a program stored in a ROM or the like.

In this embodiment, the user is assumed to, after receiving the mail transmitted in the processing of FIG. 6, perform processing in the data processing server 102 and perform processing (to be referred to as predetermined processing hereinafter) of storing, in the storage server 103, the data that has undergone image conversion. In this case, the user separately logs in to the storage server 103. The user can perform the processing permitted by the authorization code by designating the individual URL information and using the authorization code 502.

In step S701, the storage server 103 performs login processing based on information input by the user via the Web browser 441 of the information processing apparatus 104. After completion of login by the authentication processing unit 415, in step S702, the storage server 103 specifies the folder that stores the preview image and the individual URL information of the authorization code input window in accordance with user selection. In this case, the folder that stores the preview image and the individual URL information of the authorization code input window is the folder saved in step S603 of FIG. 6.

In step S703, the storage server 103 displays the preview image and the link file included in the specified folder via the Web browser 441, and makes the user confirm them. In step S704, the Web browser 441 accepts designation of the link file (individual URL information) from the user. The link file is designated when the user confirms the preview image stored in the folder, and wants to perform, in the data processing server 102, predetermined processing for the data corresponding to the preview image.

In step S705, the Web browser 441 issues a request of the authorization code input window to the data processing server 102 when the link file is designated. In step S706, the data processing server 102 causes the authorization processing unit 426 to check the requested URL. In step S707, the data processing server 102 checks whether the requested URL matches one of the pieces of individual URL information in the data management table held by the storage unit 427. If none of the pieces of information matches (NO in step S707), the data processing server 102 displays an error window in step S713 and ends the processing. If one of the pieces of information matches (YES in step S707), the data processing server 102 displays the authorization code input window on the Web browser 441 in step S708. In step S709, the data processing server 102 accepts input of the authorization code (step S607 of FIG. 6) sent from the data processing server 102 from the user via the Web browser 441. In step S710, the data processing server 102 causes the authorization processing unit 426 to check the authorization code input to the authorization code input window displayed on the Web browser 441.

If the authorization code input by the user does not match the authorization code corresponding to the individual URL information (NO in step S711), the data processing server 102 displays an error window in step S713 and ends the processing. If the authorization codes match (YES in step S711), the data processing server 102 displays a window to perform predetermined processing whose performance permission has been given to the user in step S712. This implements a second display unit. Note that the window displayed here changes depending on processing whose performance permission has been given to the user. In this embodiment, a window to instruct transmission of data having undergone image conversion from the data processing server 102 to the storage server 103 is displayed.

(Authorization Code Input Window)

Figure 13:
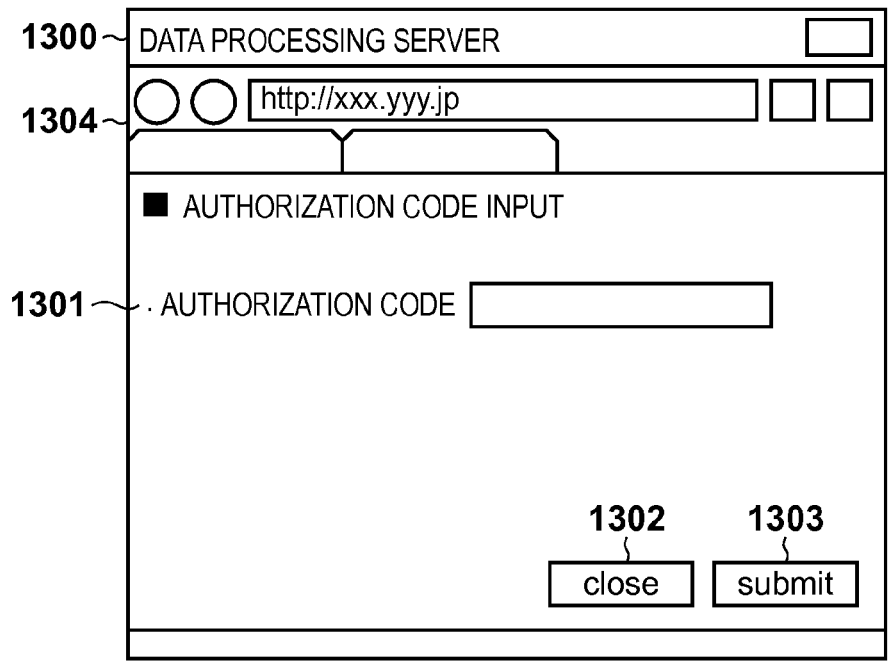
FIG. 13 is a view showing an example of an authorization code input window according to the first and third embodiments.

FIG. 13 shows an example of the authorization code input window displayed on the Web browser 441 by the data processing server 102 upon designating the individual URL information. An authorization code input window 1300 is displayed in step S708 of FIG. 7. The authorization code input window 1300 includes a submit button 1303 used to transmit input contents to the data processing server, a close button 1302 used to close the window, and a tool bar 1304 used to control the window. The user inputs the authorization code transmitted by mail from the data processing server 102 to an authorization code input field 1301, and presses the submit button 1303, thereby transmitting the authorization code to the data processing server 102.

When the flowchart shown in FIG. 7 has normally ended, the user is given the performance permission and can perform predetermined processing in the data processing server 102. For example, an image data main body that has undergone image processing can be transmitted from the data processing server 102 to the storage server 103.

Note that although in this embodiment, processing of saving data processed by the data processing server 102 in the storage server 103 has been described as predetermined processing, the present invention is not limited to this processing. The present invention is also applicable to another processing when a plurality of servers (services) cooperatively process a job.

Additionally, in this embodiment, the system includes the single data processing server 102 and the single storage server 103. However, the cooperation may be done among more services.

Second Embodiment

The second embodiment will be described next. In the first embodiment, a mechanism for checking a performance permission using an authorization code and individual URL information as shown in FIG. 7 has been described. In the second embodiment, an embodiment in which a data processing server 102 separately generates an authorization code and checks a performance permission, unlike the first embodiment, will be explained. Note that the system arrangement, software configuration, and the like are the same as in the first embodiment, and a detailed description thereof will be omitted.

(Data Management Table)

An example of the arrangement of a data management table used in this embodiment will be described first.

FIG. 12 shows a data management table held in the data processing server 102 according to this embodiment. The data management table according to this embodiment includes a tenant ID 1200, a user ID 1201, an authorization code 1 1202, an authorization code 2 1203, and individual URL information 1204. The tenant ID 1200 represents a tenant ID (ID assigned to each corporation) to which the user who has instructed job performance. The user ID 1201 is an ID assigned to the user who has instructed job performance.

The authorization code 1 1202 is an authorization code embedded in a preview image. The authorization code 2 1203 is a code input by the user to an authorization code input window 1400. In this specification, the authorization code 1 will also be referred to as first authorization information, and the authorization code 2 as second authorization information for the descriptive convenience. The individual URL information 1204 is a link file to the URL of the authorization code input window 1400 in which the authorization code issued for each job is input. When the link file is designated, the authorization code input window 1400 is displayed on a Web browser 441.

(Authorization Code Input Window)

Figure 14:
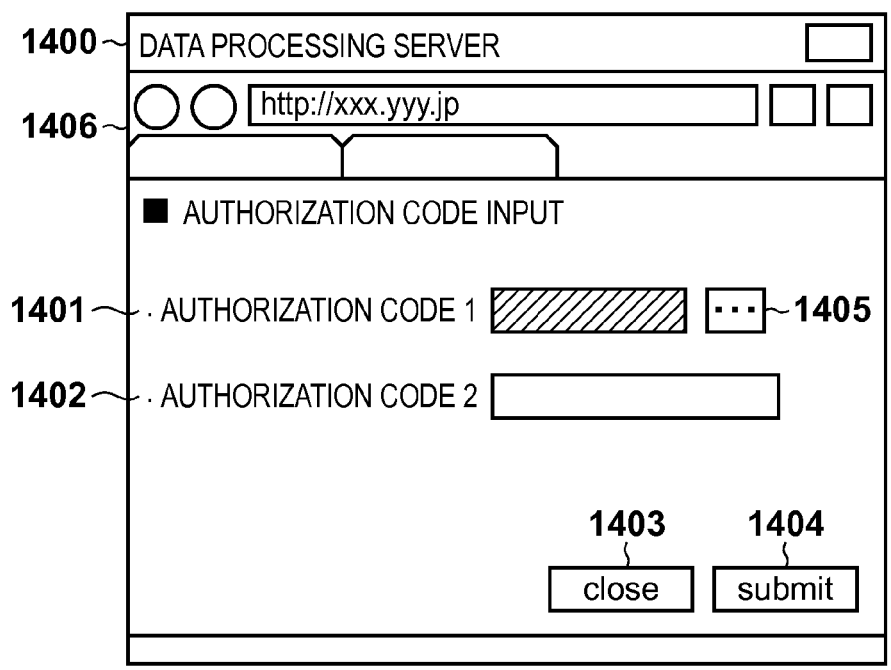
FIG. 14 is a view showing an example of an authorization code input window according to the second embodiment.

An example of the arrangement of the authorization code input window according to this embodiment will be described next. FIG. 14 shows an example of the authorization code input window 1400 displayed on the Web browser 441 by the data processing server 102 upon pressing the individual URL information. The authorization code input window 1400 includes a close button 1403 used to close the window, a submit button 1404 used to transmit input contents to the data processing server, and a tool bar 1406 used to control the window.

The user inputs the authorization code transmitted by mail to an input field 1402 of the authorization code 2. The user presses a reference button 1405 and designates the path to a folder storing a preview image in an input field 1401 of the authorization code 1. Finally, the user presses the submit button 1404, thereby completing transmission of the authorization codes to the data processing server.

[Procedure of Registering Authorization Codes and Individual URL Information]

Figure 8:
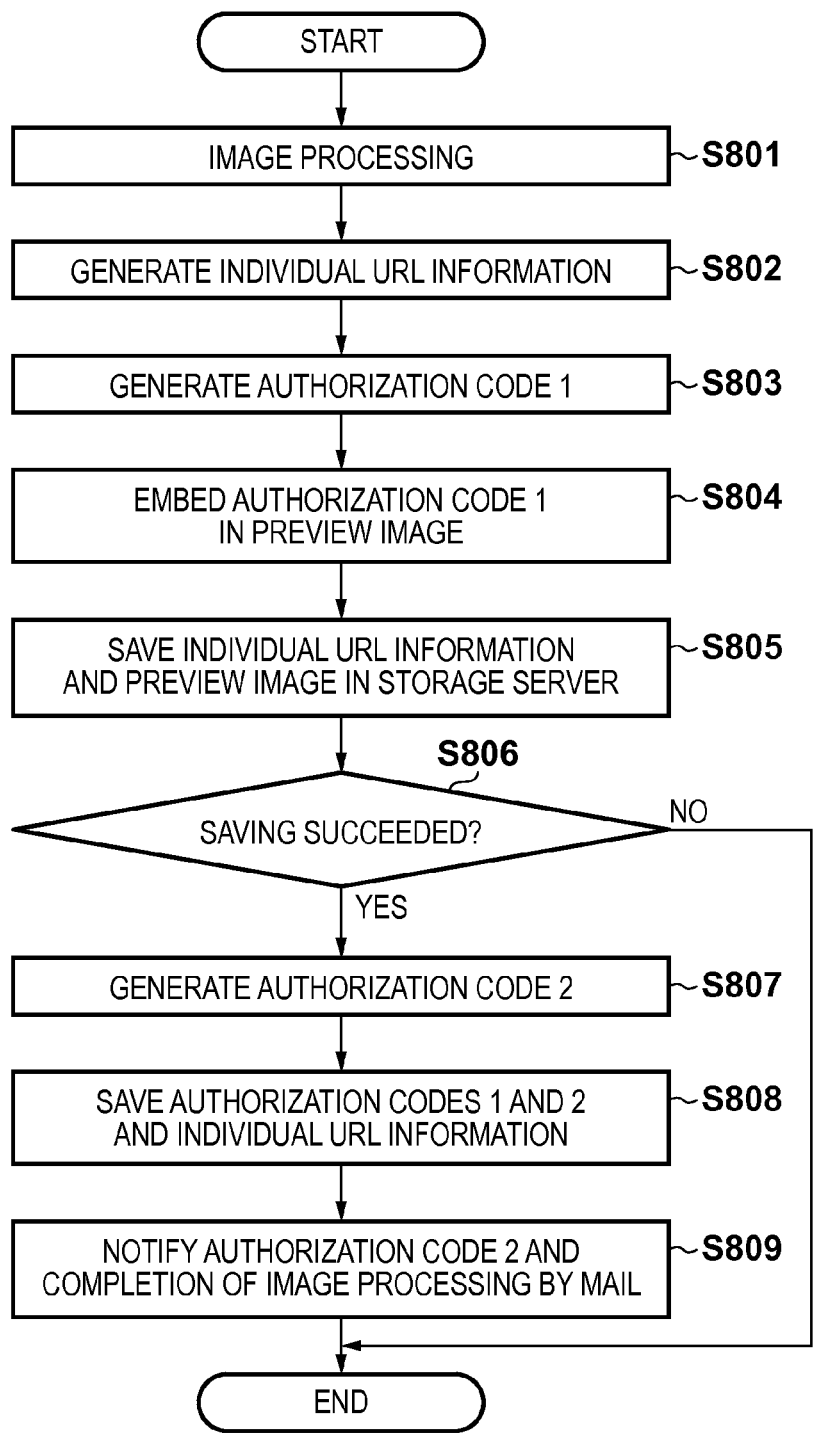
FIG. 8 is a flowchart of registration of authorization codes and individual URL information according to the second embodiment.

FIG. 8 illustrates the procedure of registering authorization codes and individual URL information according to the second embodiment. This processing procedure is implemented by causing the CPU of the data processing server 102 to read out and perform a program stored in a ROM or the like. The state before the start of this procedure is the same as in the first embodiment.

First, a program processing unit 422 of the data processing server 102 analyzes the set values of the user. The program processing unit 422 requests an image processing unit 423 and an authorization processing unit 426 to perform processing based on the analysis result.

In step S801, the data processing server 102 transmits data received from an image forming apparatus 101 from the program processing unit 422 to the image processing unit 423, and performs image processing. In this image processing, a processing image of a normal size and a processing image for preview are generated. In this embodiment, the processing image of the normal size is used as an image to be saved in a storage server 103 after authorization of processing. On the other hand, the processing image for preview is an image presented to the user when performing authorization processing. In step S802, the data processing server 102 generates individual URL information that is link information to the authorization code input window. As the individual URL information, a unique URL is generated for each job.

In step S803, the data processing server 102 generates the authorization code 1 (first authorization code) to be embedded in the preview image. In step S804, the data processing server 102 embeds the authorization code 1 in the preview image. As for the embedding method, the authorization code information can be embedded in the header portion of image information, or any other arbitrary method such as copy-forgery-inhibited pattern printing is usable as long as the data processing server 102 can extract the authorization code 1 from the preview image.

In step S805, the data processing server 102 saves the generated individual URL information (link file) and the preview image data with the embedded authorization code 1 in the storage server 103. In step S806, the data processing server 102 judges whether saving in the storage server 103 has failed. If saving has failed (NO in step S806), the processing ends. If saving has succeeded (YES in step S806), the data processing server 102 generates an authorization code 2 (second authorization code) in step S807. In step S808, the data processing server 102 associates the tenant ID, the user ID, the authorization code 1, the authorization code 2, and the individual URL information with each other, and registers them in a storage unit 427 using the data management table shown in FIG. 12.

In step S809, the data processing server 102 transmits the authorization code 2 and an image processing completion notification from a mail processing unit 425 to a mail application 442 of an information processing apparatus 104. The processing procedure thus ends.

[Procedure of Using Authorization Codes and Individual URL Information]

Figure 9:
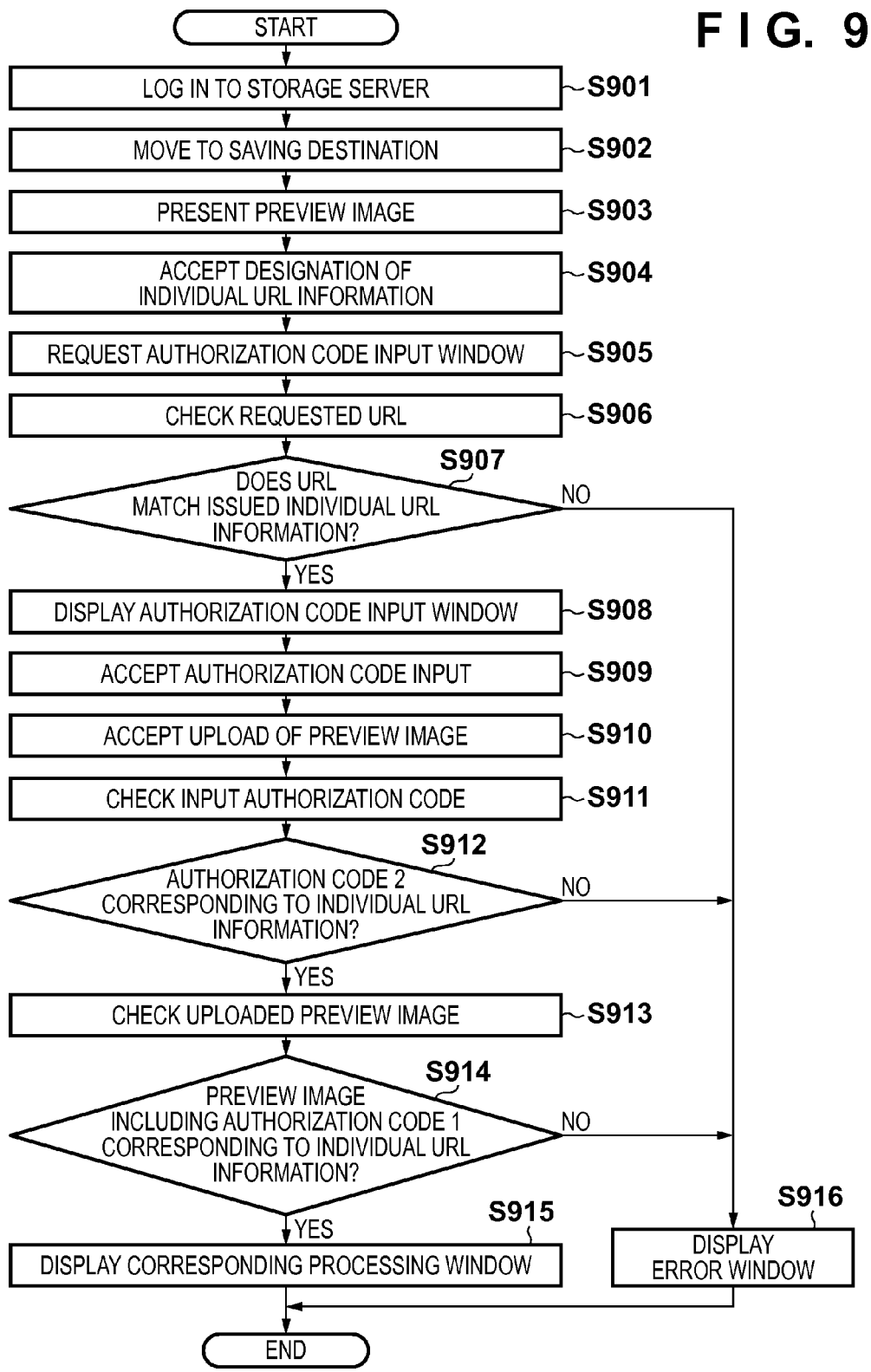
FIG. 9 is a flowchart of use of an authorization code and individual URL information according to the second embodiment.

The flowchart of FIG. 9 illustrates the processing procedure of giving a performance permission to the user according to this embodiment. This processing procedure is implemented by causing the CPU of each of the data processing server 102 and the storage server 103 to read out and perform a program stored in a ROM or the like. When this flowchart has normally ended, the same behavior as in the first embodiment is obtained, and a detailed description thereof will be omitted.

In this embodiment, the user is assumed to, after receiving the mail transmitted in the processing of FIG. 8, perform processing in the data processing server 102 and perform processing (to be referred to as predetermined processing hereinafter) of storing, in the storage server 103, the data that has undergone image conversion. In this case, the user separately logs in to the storage server 103. The user performs the processing permitted by the authorization codes by accessing the individual URL information 1204 and using the authorization code 1 and the authorization code 2.

In step S901, the storage server 103 performs login processing based on information input by the user via the Web browser 441 of the information processing apparatus 104. After completion of login by an authentication processing unit 415, in step S902, the storage server 103 specifies the folder that stores the preview image with the authorization code 1 embedded in accordance with user selection.

In step S903, the storage server 103 displays the preview image and the link file included in the specified folder via the Web browser 441, and makes the user confirm them. In step S904, the Web browser 441 accepts designation of the link file from the user. The individual URL information is designated when the user confirms the preview image stored in the folder, and wants to perform predetermined processing in the data processing server 102.

In step S905, the Web browser 441 issues a request of the authorization code input window 1400 to the data processing server 102 when the individual URL information is designated. In step S906, the data processing server 102 causes the authorization processing unit 426 to check the requested URL. In step S907, the data processing server 102 checks whether the requested URL matches one of the pieces of individual URL information 1204 in the data management table (FIG. 12) held by the storage unit 427. If none of the pieces of information matches (NO in step S907), the data processing server 102 displays an error window in step S916 and ends the processing. If one of the pieces of information matches (YES in step S907), the data processing server 102 displays the authorization code input window 1400 on the Web browser 441 in step S908. In step S909, the Web browser 441 accepts, from the user, input of the authorization code 2 sent from the data processing server 102 to the mail application 442. The authorization code 2 is input to the input field 1402 shown in FIG. 14.

In step S910, the data processing server 102 accepts, from the user, upload of the preview image with the embedded authorization code 1 via the authorization code input window 1400. The preview image to be uploaded is designated in the input field 1401 shown in FIG. 14. In step S911, the data processing server 102 causes the authorization processing unit 426 to check the authorization code input to the authorization code input window 1400. In step S912, the data processing server 102 checks whether the authorization code 2 input by the user is the authorization code 2 corresponding to the individual URL information. If the authorization codes do not match (NO in step S912), the data processing server 102 displays an error window via the Web browser 441 in step S916 and ends the processing. If the authorization codes match (YES in step S912), the data processing server 102 checks the authorization code 1 of the uploaded preview image in step S913. If the authorization code 1 corresponding to the individual URL information 1204 is not embedded in the preview image (NO in step S914), the data processing server 102 displays an error window on the Web browser 441 in step S916 and ends the processing. If the corresponding authorization code 1 is embedded (YES in step S914), the data processing server 102 displays a window to perform predetermined processing whose performance permission has been given to the user in step S915.

[Effect of Second Embodiment]

When both the authorization code input by the user and the authorization code embedded in the preview image are used, a system capable of holding higher security can be constructed in addition to the effect of the first embodiment.

Third Embodiment

In the third embodiment, a method of making the user operability higher than in the first embodiment in which individual URL information is designated, and the authorization code input window (FIG. 13) is opened will be described. Note that the system arrangement, software configuration, and the like are the same as in the first embodiment, and a description thereof will be omitted here.

[Procedure of Registering Authorization Code and Individual URL Information]

Figure 10:
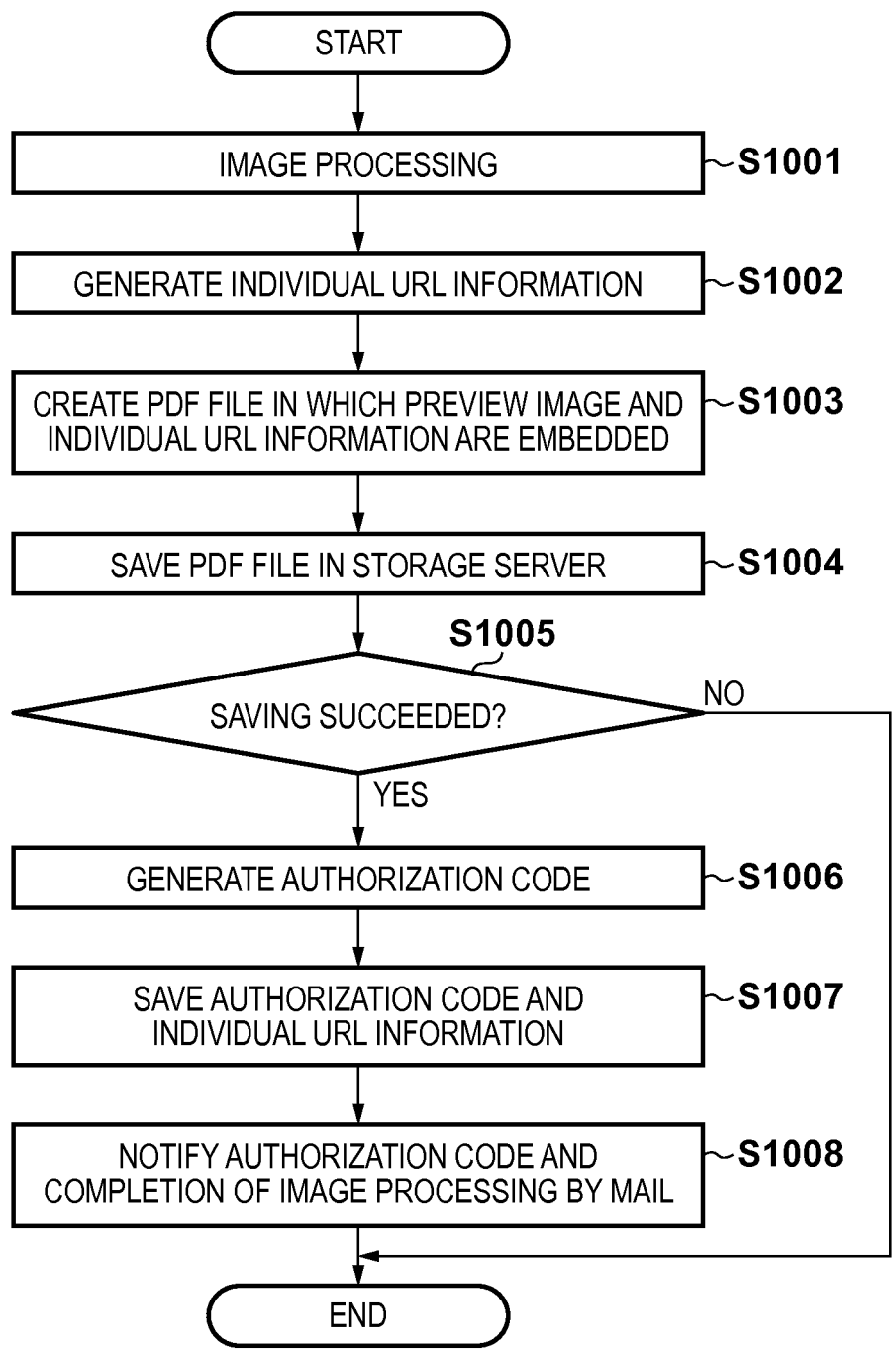
FIG. 10 is a flowchart of registration of an authorization code and individual URL information according to the third embodiment.

FIG. 10 illustrates the procedure of registering authorization codes and individual URL information according to this embodiment. This processing procedure is implemented by causing the CPU of a data processing server 102 to read out and perform a program stored in a ROM or the like. The state before the start of this procedure is the same as in the first embodiment.

First, a program processing unit 422 of the data processing server 102 analyzes the set values of the user. The program processing unit 422 requests an image processing unit 423 and an authorization processing unit 426 to perform processing based on the analysis result.

In step S1001, the data processing server 102 transmits data received from an image forming apparatus 101 from the program processing unit 422 to the image processing unit 423, and performs image processing. In this image processing, a processing image of a normal size and a processing image for preview are generated. In this embodiment, the processing image of the normal size is used as an image to be saved in a storage server 103 after authorization of processing. On the other hand, the processing image for preview is an image presented to the user when performing authorization processing. In step S1002, the data processing server 102 generates individual URL information 503 that is link information to an authorization code input window 1300 (FIG. 13). As the individual URL information, a unique URL is generated for each job.

In step S1003, the data processing server 102 creates a file of PDF (Portable Document Format) format in which the preview image and the individual URL information are embedded. Note that the file format is not limited to the PDF format, and another file format may be used if it can embed an image file and link information of a URL. In step S1004, the data processing server 102 saves the generated PDF file in the storage server 103.

In step S1005, the data processing server 102 judges whether saving in the storage server has failed. If saving has failed (NO in step S1005), the processing ends. If saving has succeeded (YES in step S1005), the data processing server 102 generates an authorization code in step S1006. In step S1007, the data processing server 102 associates the tenant ID, the user ID, the authorization code, and the individual URL information with each other, and registers them in a storage unit 427 using the data management table shown in FIG. 5. In step S1008, the data processing server 102 causes a mail processing unit 425 to transmit the authorization code and an image processing completion notification to a mail application 442 of an information processing apparatus 104.

[Procedure of Using Authorization Code and Individual URL Information]

Figure 11:
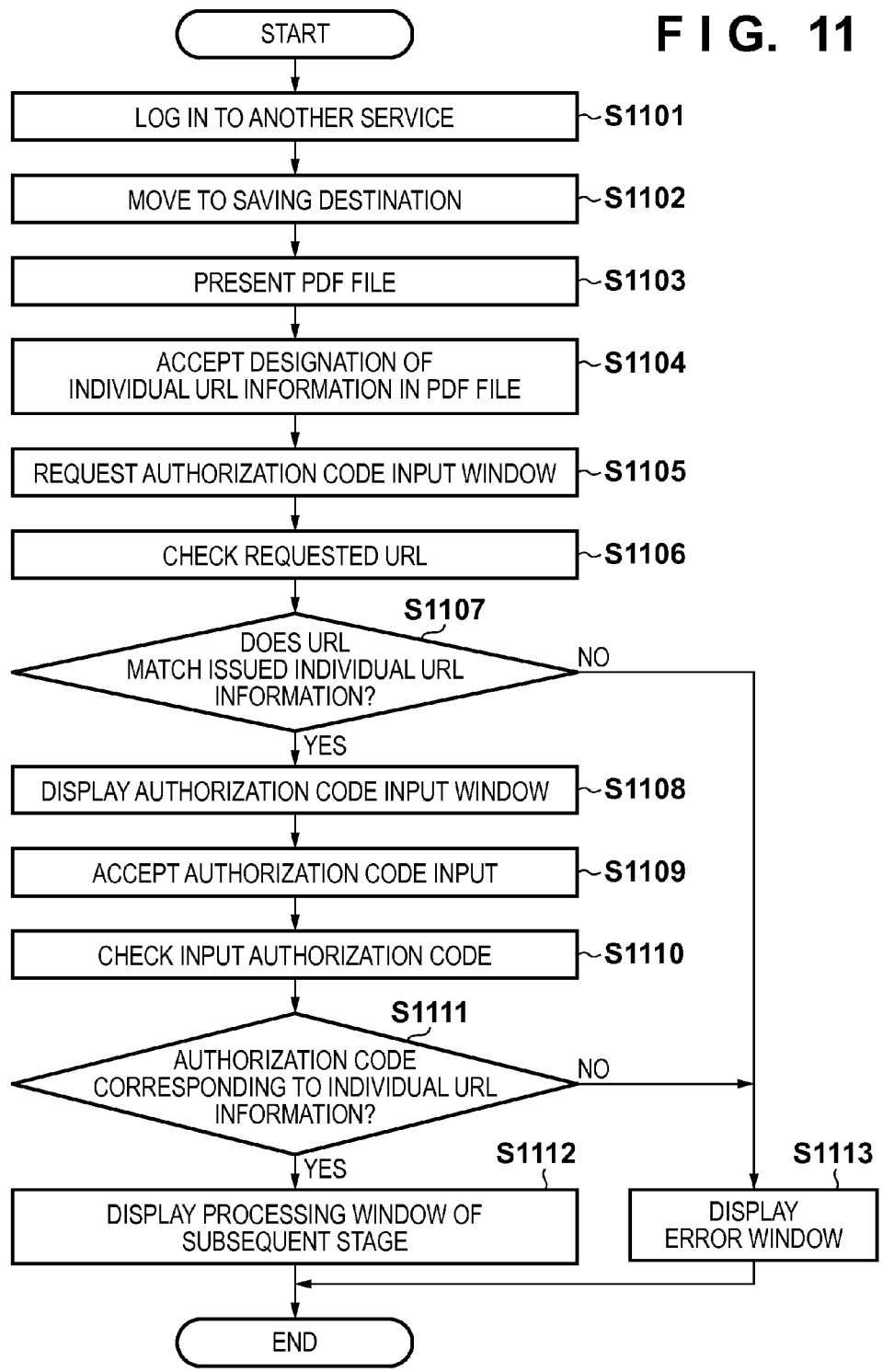
FIG. 11 is a flowchart of use of an authorization code and individual URL information according to the third embodiment.

The flowchart of FIG. 11 illustrates the processing procedure of causing the data processing server 102 to give a performance permission to the user using an authorization code 502 and the individual URL information 503. This processing procedure is implemented by causing the CPU of each of the data processing server 102 and the storage server 103 to read out and perform a program stored in a ROM or the like. Note that the behavior obtained when this flowchart has normally ended is the same as in the first embodiment, and a detailed description thereof will be omitted.

In step S1101, the storage server 103 performs login processing based on information input by the user via a Web browser 441 of the information processing apparatus 104. After completion of login by an authentication processing unit 415, in step S1102, the storage server 103 moves to the saving destination of the PDF file in accordance with user selection. In step S1103, the storage server 103 causes the user to confirm, via the Web browser 441, the PDF file at the saving destination to which the server has moved. To perform predetermined processing in the data processing server 102, the user designates the individual URL information included in the PDF file. The individual URL information is link information to the authorization code input window 1300 (FIG. 13) issued for each job.

In step S1105, the Web browser 441 issues a request of the authorization code input window 1300 (FIG. 13) to the data processing server 102 when the individual URL information is designated. In step S1106, the data processing server 102 causes the authorization processing unit 426 to check the requested URL. In step S1107, the data processing server 102 checks whether the requested URL matches one of the pieces of individual URL information 503 in the data management table (FIG. 5) held by the storage unit 427. If none of the pieces of information matches (NO in step S1107), the data processing server 102 displays an error window in step S1113 and ends the processing. If one of the pieces of information matches (YES in step S1107), the data processing server 102 displays the authorization code input window 1300 (FIG. 13) on the Web browser 441 in step S1108.

In step S1109, the Web browser 441 accepts input of the authorization code sent from the data processing server 102 from the user. In step S1110, the data processing server 102 causes the authorization processing unit 426 to check the authorization code input to the authorization code input window 1300 (FIG. 13).

If the authorization code input by the user does not match the authorization code corresponding to the individual URL information (NO in step S1111), the data processing server 102 displays an error window in step S1113 and ends the processing. If the authorization codes match (YES in step S1111), the data processing server 102 displays a window to perform predetermined processing whose performance permission has been given to the user in step S1112. Note that the displayed window changes depending on processing whose performance permission has been given to the user.

[Effect of Third Embodiment]

According to this embodiment, the PDF file including the preview image and the individual URL information is generated. Hence, the user can simultaneously do preview image confirmation and URL link designation, and the operability can be improved as compared to a case in which the link file is individually designated.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-270702, filed Dec. 11, 2012, which is hereby incorporated by reference herein in its entirety.

What is claimed is:

1. A first server providing a first service in an information processing system, wherein the first server comprises a processor and a memory, cooperating to function as units comprising:
   a generation unit configured to generate authorization information to use a function of the first service and link information to call an input window of the authorization information;
   a holding unit configured to hold the link information and the authorization information in association with each other;
   a providing unit configured to provide the link information to a second server providing a second service;
   a notification unit configured to notify a user of the authorization information;
   a displaying unit configured to display the input window corresponding to the link information on an apparatus used by the user when the user has designated the link information obtained from the second server providing the second service; and a permission unit configured to permit the second service to use the function of the first service when the user has input the notified authorization information to the input window displayed by said displaying unit.

2. The first server according to claim 1, wherein each of the first service and the second service is provided by one or a plurality of server groups.

3. A server providing a first service in an information processing system, wherein the first server comprises a processor and a memory, cooperating to function as units comprising:

a processing unit configured to obtain a processing result of the first service by processing a job in accordance with an instruction of a user;

a generation unit configured to generate authorization information to use the processing result of the first service and link information to call an input window of the authorization information;

a holding unit configured to hold the link information and the authorization information in association with each other;

a providing unit configured to provide the link information to a second server providing a second service;

a notification unit configured to notify a user of the authorization information;

a displaying unit configured to display the input window corresponding to the link information on an apparatus used by the user when the user has designated the link information obtained from the second server providing the second service; and a permission unit configured to permit the second service to use the processing result of the first service when the user has input the notified authorization information to the input window displayed by said displaying unit.

4. The first server according to claim 3, wherein said generation unit generates, as the link information, a URL to call the input window and a preview image representing the processing result by said processing unit.

5. The first server according to claim 4, wherein said generation unit generates first authorization information and second authorization information and embeds the first authorization information in the preview image, wherein said notification unit notifies the user of the second authorization information, and wherein said permission unit permits the second server providing the second service to use the processing result of the first service when the user has input the preview image in which the first authorization information is embedded and the second authorization information to the input window displayed by said displaying unit.

6. The first server according to claim 3, wherein said generation unit generates, as the link information, a file of PDF format including a URL to call the input window and a preview image representing the processing result by said processing unit.

7. The first server according to claim 3, wherein said first service further comprises a second displaying unit that displays a window corresponding to processing to be performed using the processing result in said second service when said permission unit permits the second service to use the processing result of the first service.

8. The first server according to claim 3, wherein the first service is a data processing service that processes data of the job, and wherein the second service is a storage service that holds the data processed by the first service.

9. A control method of an information processing system in which a plurality of services cooperatively perform processing, the method comprising:

in a first service, generating authorization information to use a function of a first service and link information to call an input window of the authorization information;

holding the link information and the authorization information in a storage unit in association with each other;

providing the link information to a second server providing a second service;

notifying a user of the authorization information;

displaying the input window corresponding to the link information on an apparatus used by the user when the user has designated the link information obtained from the second server providing the second service; and permitting the second server to use the function of the first service when the user has input the notified authorization information to the input window displayed in the displaying step.

10. A control method of an information processing system in which a plurality of services cooperatively process a job, the method comprising:

in a first service, obtaining a processing result of the first service by processing a job in accordance with an instruction of a user;

generating authorization information to use the processing result of the first service and link information to call an input window of the authorization information;

holding the link information and the authorization information in a storage unit in association with each other;

providing the link information to a second server providing a second service;

notifying a user of the authorization information;

displaying the input window corresponding to the link information on an apparatus used by the user when the user has designated the link information obtained from the second server providing the second service; and permitting the second service to use the processing result of the first service when the user has input the notified authorization information to the input window displayed in the displaying step.

11. A non-transitory computer-readable medium storing a program that causes a computer to function as units comprising:

a generation unit configured to generate authorization information to use a function of a first service and link information to call an input window of the authorization information;

a holding unit configured to hold the link information and the authorization information in association with each other;

a providing unit configured to provide the link information to another computer providing a second service;

a notification unit configured to notify a user of the authorization information;

a displaying unit configured to display the input window corresponding to the link information on an apparatus used by the user when the user has designated the link information obtained from the another computer providing the second service; and a permission unit configured to permit the second service to use the function of the first service when the user has input the notified authorization information to the input window displayed by said displaying unit.

12. A non-transitory computer-readable medium storing a program that causes a computer to function as units comprising:
- a processing unit configured to obtain a processing result of the first service by processing a job in accordance with an instruction of a user;
- a generation unit configured to generate authorization information to use the processing result of the first service and link information to call an input window of the authorization information;
- a holding unit configured to hold the link information and the authorization information in association with each other;
- a providing unit configured to provide the link information to a second server providing a second service;
- a notification unit configured to notify a user of the authorization information;
- a displaying unit configured to display the input window corresponding to the link information on an apparatus used by the user when the user has designated the link information obtained from the second server providing the second service; and
- a permission unit configured to permit the second service to use the processing result of the first service when the user has input the notified authorization information to the input window displayed by said displaying unit.

* * * * *